(12) United States Patent
Sekiguchi (10) Patent No.: US 10,850,459 B2
(45) Date of Patent: Dec. 1, 2020

(54) PUNCTURE REPAIR KIT

(71) Applicant: The Yokohama Rubber Co., LTD., Tokyo (JP)

(72) Inventor: Takumi Sekiguchi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 16/302,600

(22) PCT Filed: Jul. 3, 2017

(86) PCT No.: PCT/JP2017/024365
§ 371 (c)(1),
(2) Date: Nov. 16, 2018

(87) PCT Pub. No.: WO2018/020962
PCT Pub. Date: Feb. 1, 2018

(65) Prior Publication Data
US 2019/0152172 A1     May 23, 2019

(30) Foreign Application Priority Data

Jul. 27, 2016   (JP) .................................. 2016-146878

(51) Int. Cl.
*B29C 73/02* (2006.01)
*H01R 13/46* (2006.01)
*H01R 13/72* (2006.01)
*B29L 30/00* (2006.01)

(52) U.S. Cl.
CPC ............ *B29C 73/025* (2013.01); *B29C 73/02* (2013.01); *H01R 13/46* (2013.01); *H01R 13/72* (2013.01); *B29L 2030/00* (2013.01)

(58) Field of Classification Search
CPC ....... B29C 73/025; B29C 73/02; B29C 73/24; H01R 13/46; H01R 13/72; H01R 24/38; B29L 2030/00; H02G 11/02
USPC .......................................................... 141/38
See application file for complete search history.

(56) References Cited

U.S. PATENT DOCUMENTS

2010/0186849 A1* 7/2010 Yoshida ................ B29C 73/166
141/38

FOREIGN PATENT DOCUMENTS

| DE | 10 2008 033 477 | 4/2010 |
|---|---|---|
| EP | 2 163 374 | 3/2010 |
| JP | 2006-137240 | 6/2006 |
| JP | 2007-083485 | 4/2007 |
| JP | 2010-179569 | 8/2010 |
| JP | 2011-046112 | 3/2011 |

(Continued)

OTHER PUBLICATIONS

Translation of JP 2006-137240 (Year: 2006).*
International Search Report for International Application No. PCT/JP2017/024365 dated Aug. 1, 2017, 4 pages, Japan.

*Primary Examiner* — Craig M Schneider
*Assistant Examiner* — Jason K Niesz
(74) *Attorney, Agent, or Firm* — Thorpe North & Western (57) ABSTRACT

A puncture repair kit includes a container that stores a puncture repair liquid and a compressor that supplies compressed air. The compressor includes a power cable for connection to a power supply when in use. The power cable includes a cable body including one end connected to a compressor body and another end provided with a connection terminal. The puncture repair kit includes a winding-up tool that winds up the cable body.

4 Claims, 9 Drawing Sheets

(56) References Cited

FOREIGN PATENT DOCUMENTS

| | | |
|---|---|---|
| JP | 2013-220622 | 10/2013 |
| WO | WO 2008/156007 | 12/2008 |
| WO | WO 2010/006771 | 1/2010 |
| WO | WO 2016/012989 | 1/2016 |

\* cited by examiner

FIG. 9B

PUNCTURE REPAIR KIT

TECHNICAL FIELD

The present technology relates to a puncture repair kit including a container and a compressor and particularly relates to a puncture repair kit that enables a power cable of a compressor to be easily stored.

BACKGROUND ART

In recent years, when a tire mounted to a vehicle is punctured, a puncture repair liquid is injected into the tire via a tire valve to temporarily repair the punctured tire. Examples of a device enabling such a temporary repair include a puncture repair kit (for example, see Japan Unexamined Patent Publication No. 2013-220622). Employing such a puncture repair kit eliminates the need to mount a spare tire on the vehicle, which makes it possible to save resources and reduce the weight of the vehicle. There is also an advantage that a space in the vehicle for storing the spare tire can be used for other purposes.

Such a puncture repair kit generally includes a container configured to store a puncture repair liquid and a compressor configured to supply compressed air. The compressor is used to feed by pressure the puncture repair liquid in the container through a hose or to inflate the tire that has been repaired. In either case, the compressor used in the puncture repair kit includes a power cable to be powered from an external power supply such as a cigarette socket. In the conventional puncture repair kit, such a power cable is stored, for example, in a recessed portion (storage portion) provided in a back surface or the like of a housing in which the compressor is stored. However, the power cable usually is approximate 3-meter long. Thus, an operator may have difficulty storing the power cable again in the storage portion after puncture repair work. Obviously, if the capacity of such a storage portion is increased, the power cable is easily stored. However, the puncture repair kit and the compressor are required to be small in size to be mounted in the vehicle. Consequently, the storage portion is not allowed to be increased in size, and thus a different measure to easily store the power cable is required.

SUMMARY

The present technology provides a puncture repair kit including a container and a compressor, which enables a power cable of the compressor to be easily stored.

A puncture repair kit according to the present technology includes a container that stores a puncture repair liquid and a compressor that supplies compressed air. The compressor includes a power cable for connection to a power supply when in use. The power cable includes a cable body including one end connected to the compressor and another end provided with a connection terminal. The puncture repair kit includes a winding-up tool that winds up the cable body.

According to an embodiment of the present technology, since the winding-up tool is provided as described above, an operator can wind up the power cable on the winding-up tool to easily bundle the power cable. At this time, the wound-up power cable is bundled into a predetermined wound state. Thus, the power cable can be easily bundled compactly compared with a case where an operator stores the power cable in an optionally selected way as in a known puncture repair kit.

According to an embodiment of the present technology, the compressor may be housed in the housing, and the housing may include a storage portion that stores the winding-up tool with the cable body wound up. In such a configuration, after using the puncture repair kit, the kit can be easily restored to a state where the power cable is wound up on the winding-up tool to be stored in the storage portion (that is, the same state as a new kit). Thus, the storability of the puncture repair kit itself can be enhanced.

According to an embodiment of the present technology, the winding-up tool may include a holding portion that detachably holds the connection terminal. In such a configuration, the entire power cable including the connection terminal can be bundled to be stored in a predetermined size. Thus, the storability of the puncture repair kit itself is effectively enhanced while the power cable is allowed to be easily stored.

According to an embodiment of the present technology, the winding-up tool may be detachably attached to the cable body. In such a configuration, when the puncture repair kit is in use (that is, when the winding-up tool is not in use), the winding-up tool can be locked to the cable body and the winding-up tool can be prevented from going missing.

According to the present technology, a mark indicating a range of the cable body to be wound up on the winding-up tool may be applied to the cable body. In such a configuration, it is clarified how much of what region of the cable body to be wound up. Thus, the power cable is easily put into an appropriate wound state by an operator.

BRIEF DESCRIPTION OF DRAWINGS

FIGS. 3A and 3B are schematic diagrams illustrating a winding-up tool included in a puncture repair kit according to an embodiment of the present technology.

FIGS. 4A and 4B are schematic diagrams illustrating a winding-up tool included in a puncture repair kit according to another embodiment of the present technology.

FIGS. 5A and 5B are schematic diagrams illustrating a winding-up tool included in a puncture repair kit according to still another embodiment of the present technology.

FIGS. 9A and 9B are schematic diagrams illustrating a compressor and a winding-up tool that are included in a puncture repair kit according to still another embodiment of the present technology.

DETAILED DESCRIPTION

Configuration of embodiments according to the present technology will be described in detail below with reference to the accompanying drawings.

Figure 1:
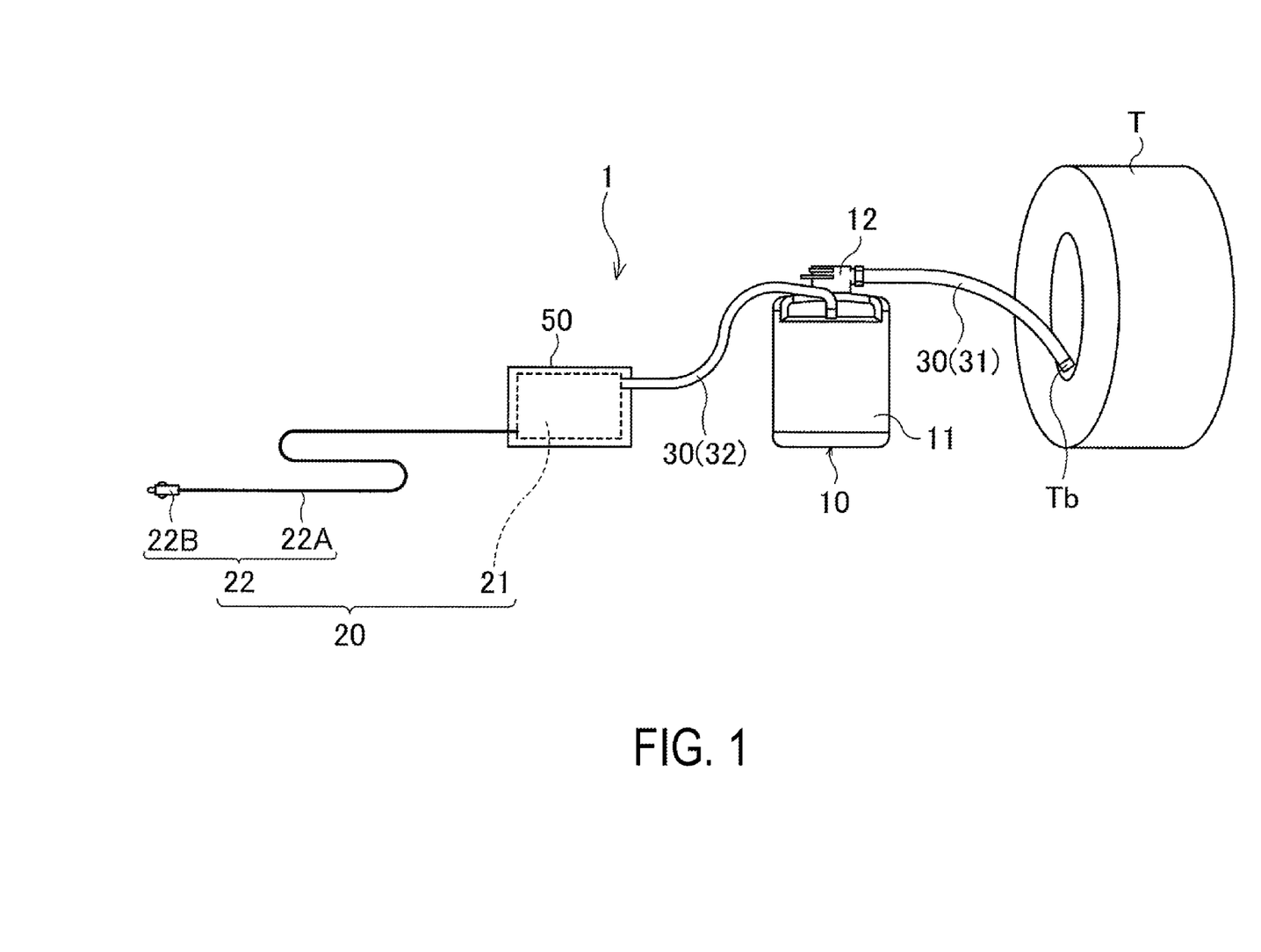
FIG. 1 is an explanatory diagram illustrating an example of a puncture repair liquid kit.

As illustrated in FIG. 1, a puncture repair kit 1 according to an embodiment of the present technology includes a container 10, a compressor 20, and a hose 30. In the example of FIG. 1, the container 10 includes a cylindrical container body 11 that stores a puncture repair liquid and a cap 12 that attaches to the container body 11 and can connect to the hose 30 that will be described below. The hose 30 includes a hose 31 connecting the container 10 to a tire T (tire valve Tb) and a hose 32 connecting the container 10 to the compressor 20. The compressor 20 in the example of FIG. 1 is configured to supply compressed air for feeding by pressure through the hose 30 the puncture repair liquid in the container 10. The compressor 20 includes a compressor body 21 including a component such as a pump that functions to supply the compressed air and a power cable 22 that connects for use to an external power supply (for example, a cigarette socket in a vehicle) to supply power to the compressor body 21. Also, in the example of FIG. 1, the compressor body 21 is housed in a housing 50 that will be described below. The power cable 22 is connected to the compressor body 21 and extends to the outside of the housing 50.

Figure 2:
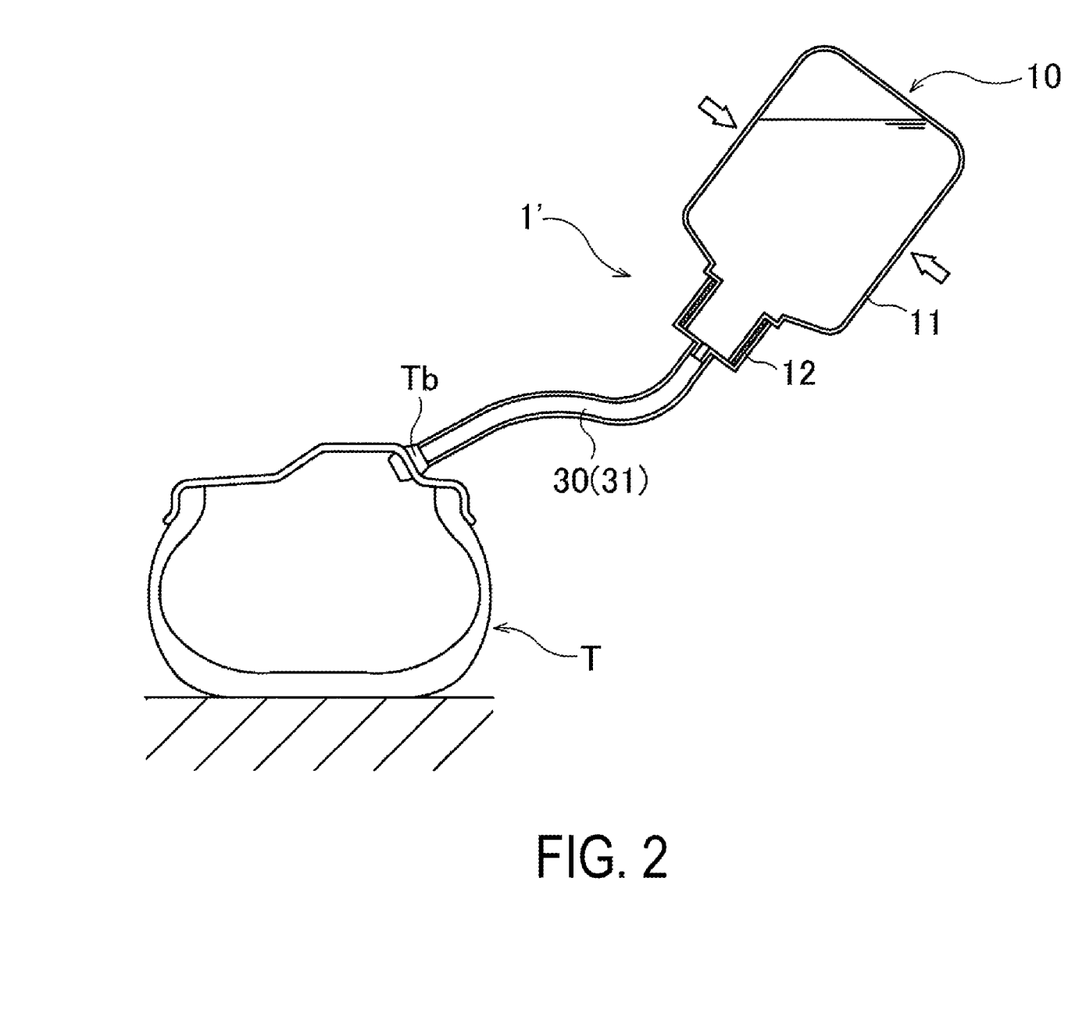
FIG. 2 is an explanatory diagram illustrating another example of a puncture repair liquid kit.

As illustrated in FIG. 2, a puncture repair kit 1' (so-called hand squeeze type puncture repair kit 1') is also known as a puncture repair kit. The puncture repair kit 1' is configured such that the container 10 is connected via the hose 30 to the tire T only and that an operator compresses the container 10 in directions indicated by arrows in FIG. 2 to feed the puncture repair liquid into the tire T. Even such a hand squeeze type puncture repair kit 1' includes the compressor 20 (not shown) configured to inflate the pneumatic tire T that has been repaired. The compressor 20 included in the hand squeeze type puncture repair kit 1' also includes the compressor body 21 and the power cable 22.

In either case, the power cable 22 of the compressor 20 includes a cable body 22A and a connection terminal 22B. The cable body 22A includes one end connected to the compressor body 21 and another end provided with the connection terminal 22B. The power cable 22 (the cable body 22A) ranges in length from 2.5 m to 3.5 m, for example.

Figure 3A:
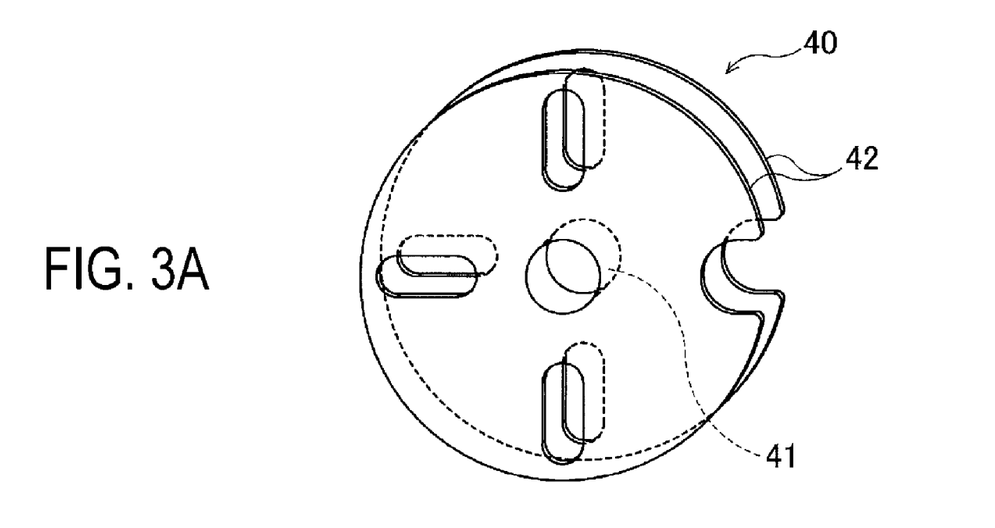
FIG. 3A illustrates a state before a power code is wound up.
Figure 3B:
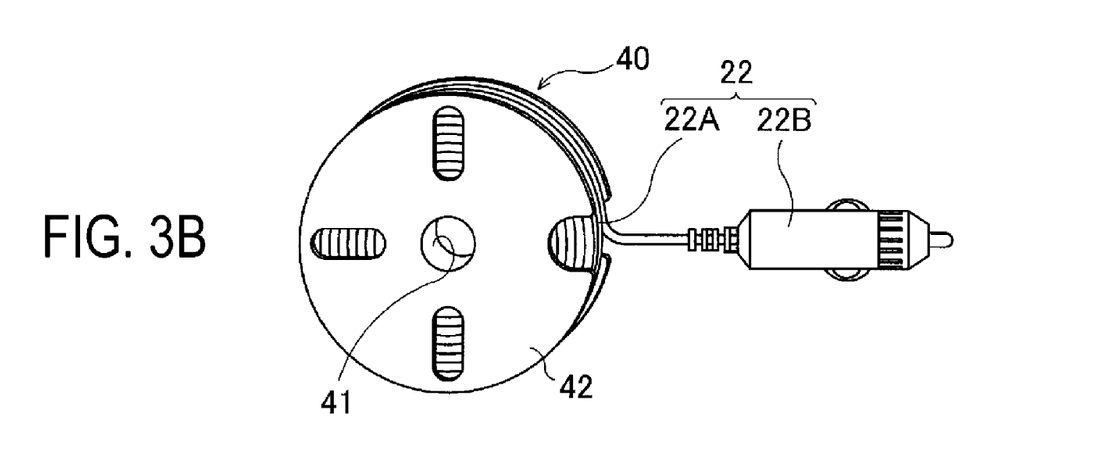
FIG. 3B illustrates a state after the power code is wound up.
Figure 4A:
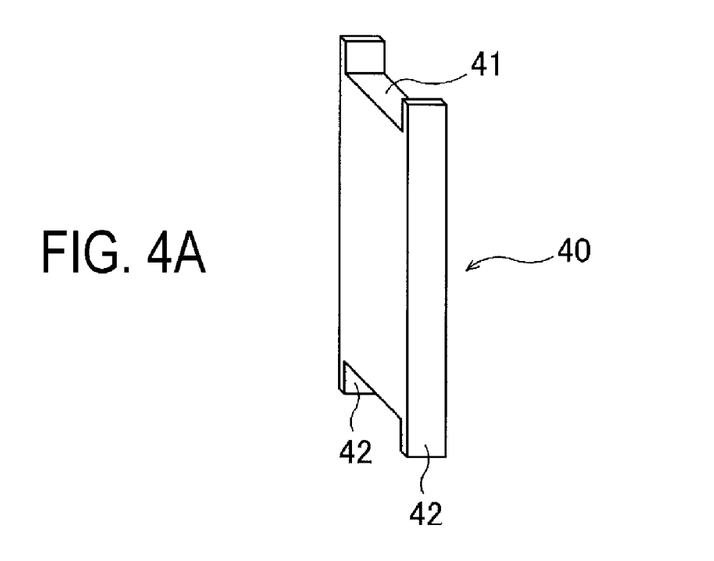
FIG. 4A illustrates a state before the power code is wound up.
Figure 4B:
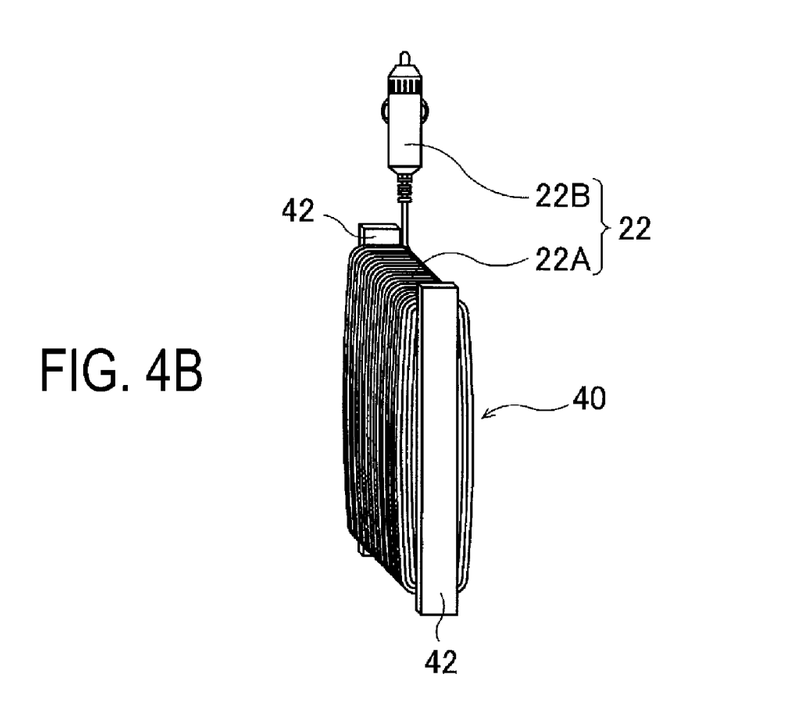
FIG. 4B illustrates a state after the power code is wound up.
Figure 5A:
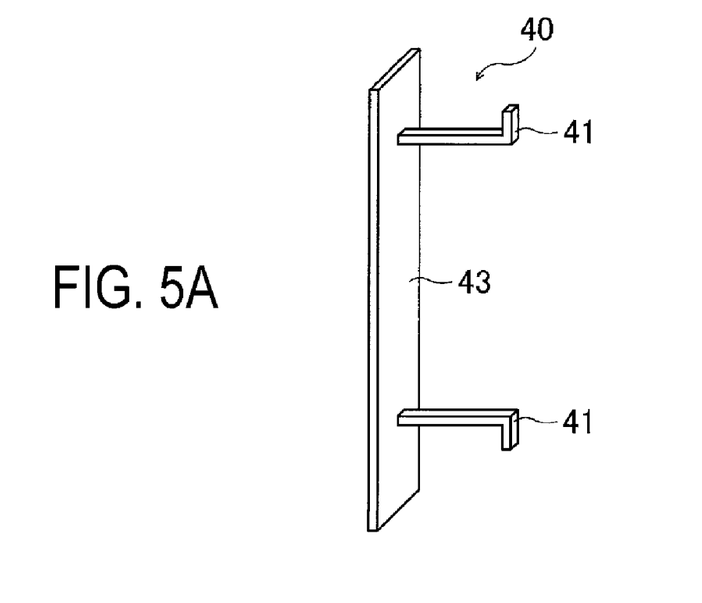
FIG. 5A illustrates a state before the power code is wound up.
Figure 5B:
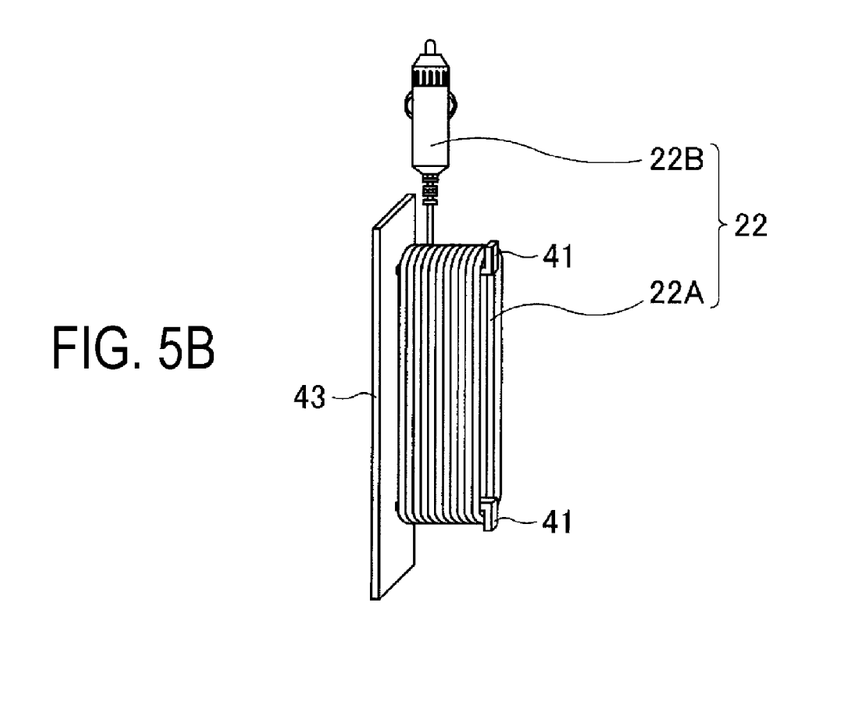
FIG. 5B illustrates a state after the power code is wound up.

The puncture repair kit 1 according to an embodiment of the present technology includes a winding-up tool 40 that winds up the power cable 22 (at least a portion of the cable body 22A). As long as the winding-up tool 40 can wind up the power cable 22 to bundle the power cable 22 into a predetermined wound shape suitable for storage, the winding-up tool 40 may be configured in any manner. For example, the winding-up tool 40 illustrated in FIG. 3 includes a reel portion 41 with a cylindrical shape and flanges 42 with a disk-like shape provided at opposite ends of the reel portion 41, as illustrated in FIG. 3A. The power cable 22 is designed to be wound up around the reel portion 41 and between the pair of flanges 42, as illustrated in FIG. 3B. Alternatively, the winding-up tool 40 illustrated in FIG. 4 includes the reel portion 41 with a plate-like shape and the flanges 42 with a plate-like shape provided at the opposite ends of the reel portion 41, as illustrated in FIG. 4A. The power cable 22 is designed to be wound up around the reel portion 41 and the pair of flanges 42, as illustrated in FIG. 4B. Alternatively, the winding-up tool 40 illustrated in FIG. 5 includes a pair of reel portions 41 with a hook-like shape arranged on a plate-shaped base 43 at a predetermined interval, as illustrated in FIG. 5A. The power cable 22 is designed to be wound up on the reel portions 41 to span between and around the reel portions 41, as illustrated in FIG. 5B.

As described above, since the puncture repair kit according to an embodiment of the present technology includes the winding-up tool 40, an operator can wind up the power cable 22 on the winding-up tool 40 to easily bundle the power cable 22. At this time, the bundled power cable 22 is wound up on the winding-up tool 40 in a predetermined wound shape. Thus, compared with a case where an operator stores the power cable 22 in an optionally selected way as in a known puncture repair kit, the power cable 22 can be easily bundled compactly.

One or more of the reel portions 41 of the winding-up tool 40 may include a groove corresponding to the cross-sectional shape of the power cable 22 or the surface of one or more of the reel portions 41 may be processed into a corrugated shape corresponding to the cross-sectional shape of the power cable 22, to enable the power cable to be guided in place at the time of winding-up of the power cable 22.

Figure 6:
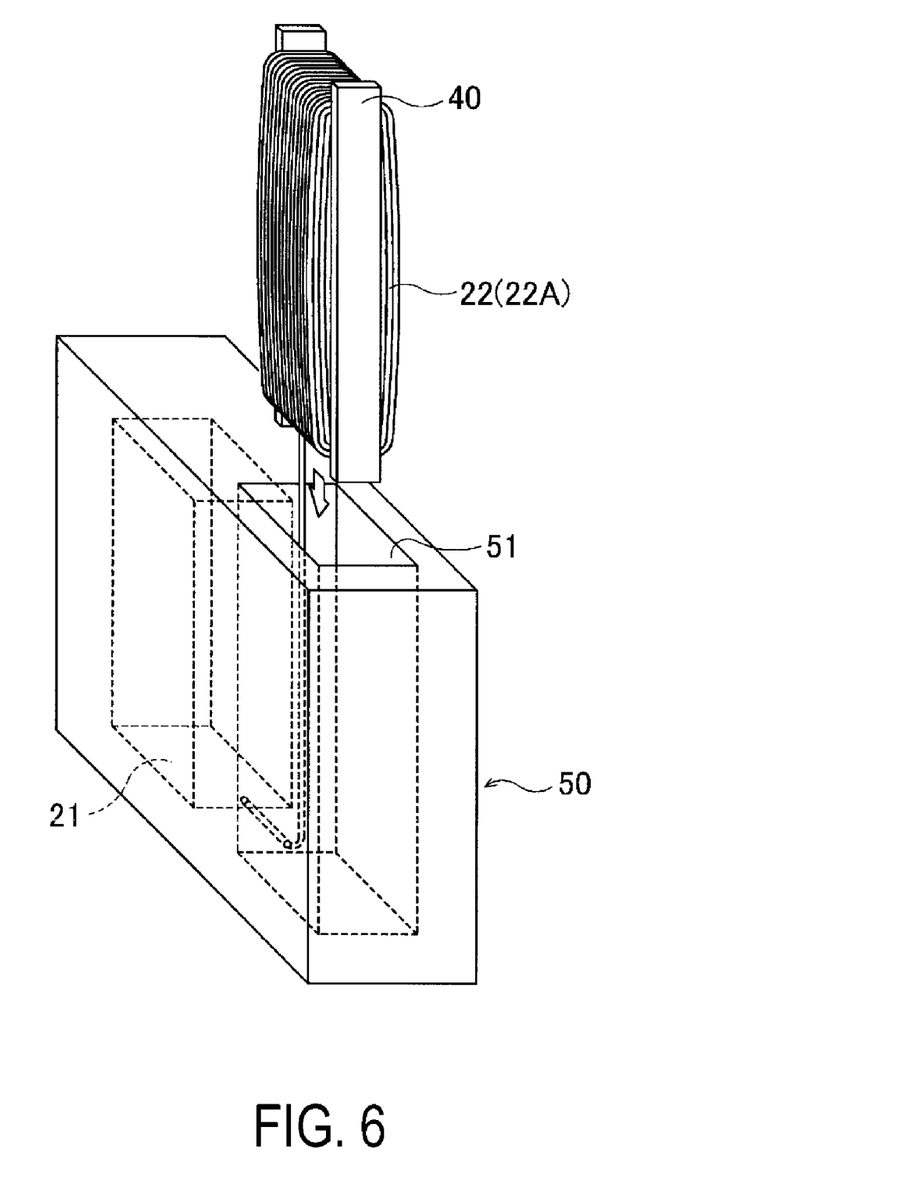
FIG. 6 is a schematic diagram illustrating a compressor and a winding-up tool that are included in a puncture repair kit according to a further embodiment of the present technology.

The compressor 20 of the puncture repair kit according to an embodiment of the present technology may be configured such that a component (the compressor body 21) such as a pump is housed in the housing 50. Alternatively, the entire puncture repair kit may be integrally configured such that the container 10 and the compressor body 21 are housed and connected in the housing 50 in the puncture repair kit. In an configuration in which the puncture repair kit includes the housing 50 in this manner (a configuration in which the puncture repair kit 1 is configured such that a portion or all of the components are housed in the housing 50), as illustrated in FIG. 6, a storage portion 51 for storing the winding-up tool 40 with the power cable 22 wound up may be provided in the housing 50 (with the built-in compressor body 21 in an example of FIG. 6). In the example of FIG. 6, the storage portion 51 is provided as a hole in which the winding-up tool 40 with the power cable 22 wound up can be stored. The winding-up tool 40 with the power cable 22 wound up can be inserted in the direction indicated by an arrow in FIG. 6 to store the winding-up tool. In such a configuration, after using the puncture repair kit, the kit can be easily restored in a state where the power cable 22 is wound up on the winding-up tool 40 to be stored in the storage portion 51 (that is, the same state as a new kit). Thus, the storability of the entire puncture repair kit can be enhanced. In addition, in FIG. 6, the connection terminal 22B is not illustrated to clarify the relationship between the winding-up tool 40 with the power cable 22 (the cable body 22A) wound up and the storage portion 51.

Figure 7:
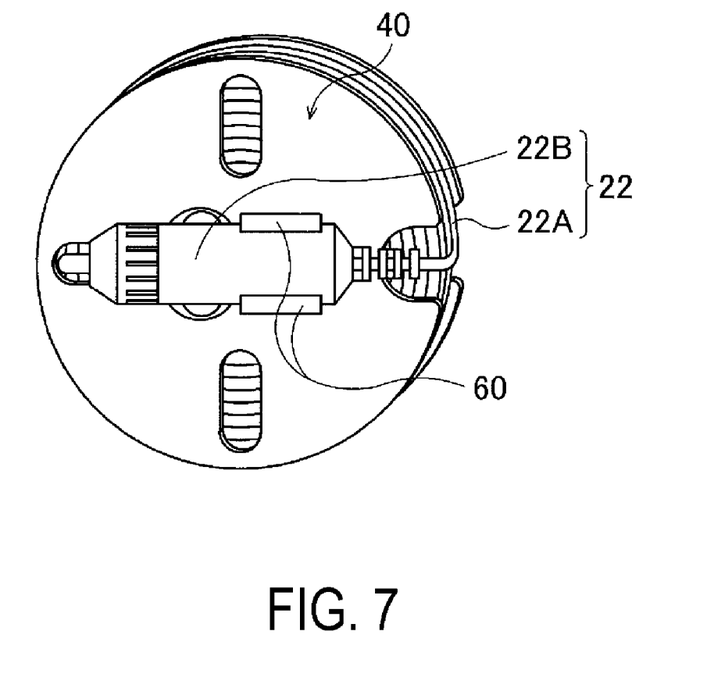
FIG. 7 is a schematic diagram illustrating a winding-up tool included in a puncture repair kit according to a still further embodiment of the present technology.

As just described, the power cable 22 includes the cable body 22A and the connection terminal 22B; however, it is only required that at least the cable body 22A is wound up when the power cable 22 is wound up on the winding-up tool 40. At this time, the connection terminal 22B may be placed in any position. For example, as illustrated in FIG. 7, holding portions 60 that detachably hold the connection terminal 22B may be provided on the winding-up tool 40, so that the connection terminal 22B is also held when the power cable 22 is wound up on the winding-up tool 40. In the example of FIG. 7, the pair of holding portions 60 between which the connection terminal 22B is interposed is formed on an outer surface of the flange 42 of the winding-up tool 40 having the common structure with the winding-up tool 40 in FIG. 3. Alternatively, a recess in which an end of the connection terminal 22B can be inserted may be provided.

Figure 8:
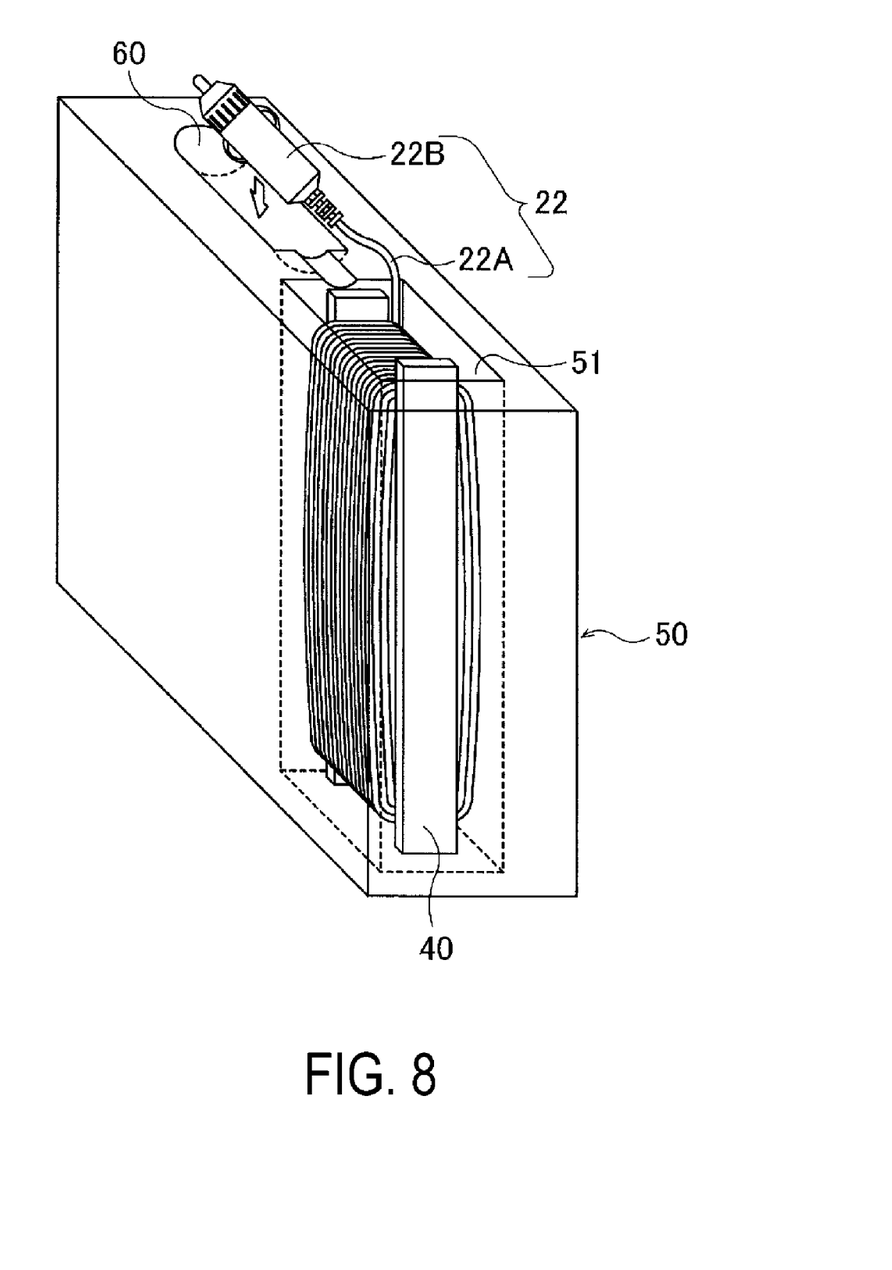
FIG. 8 is a schematic diagram illustrating a compressor and a winding-up tool that are included in a puncture repair kit according to another embodiment of the present technology.

Further, in a configuration in which the puncture repair kit includes the housing 50 as described above, the connection terminal 22B may configured so as to be stored in the storage portion 51 provided in the housing 50, together with the winding-up tool 40 on which the power cable 22 is wound up. Furthermore, as illustrated in FIG. 8, the holding portion 60 for the connection terminal 22B may be provided in the housing 50 separately from the storage portion 51 for the winding-up tool 40. In the example of FIG. 8, the holding portion 60 having a recessed shape corresponding to the connection terminal 22B is provided, and the connection terminal 22B is fitted in the direction indicated by the arrow in FIG. 8 into the holding portion 60 to be stored therein. In addition, in FIG. 8, other components included in the housing 50 of the puncture repair kit and a connection location between the compressor body 21 and the power cable 22 are not illustrated to clarify the structures of the storage portion 51 and the holding portion 60.

In a state where the power cable 22 is wound up on the winding-up tool 40, the winding-up tool 40 is conversely held by the power cable 22 extending from the compressor body 21. Once the power cable 22 is entirely unwound out to use the puncture repair kit 1, the winding-up tool 40 separates from other components (the container 10, the compressor 20, and the like) of the puncture repair kit 1. Accordingly, the winding-up tool 40 may be lost during repairing. Thus, the winding-up tool 40 may be detachably attached to the cable body 22A and locked to the cable body 22A when using the puncture repair kit 1 (that is, when not using the winding-up tool 40).

Figure 9A:
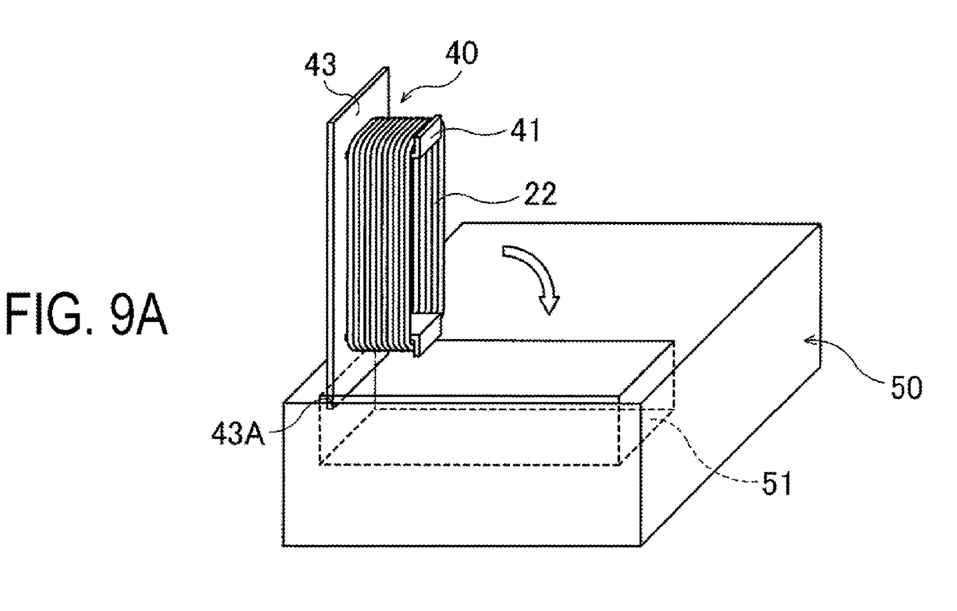
FIG. 9A illustrates a state where a power code winding operation is in progress (or being unwound)
Figure 9B:
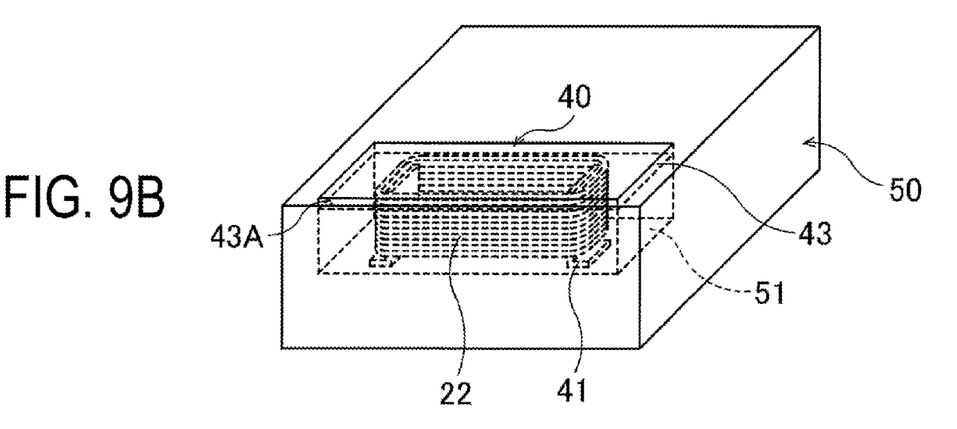
FIG. 9B illustrates a state where the winding-up tool with the power code wound up is housed in the compressor (a housing).

Also, in a configuration in which the puncture repair kit 1 includes the housing 50 and the housing 50 includes the storage portion 51 for storing the winding-up tool 40 as described above, the winding-up tool 40 may be integrally formed with the housing 50 as illustrated in FIG. 9. In the example of FIG. 9, the winding-up tool 40 includes the base 43 and the reel portions 41 in the same way as in an example of FIG. 5. One end of the base 43 is a shaft 43A attached to a rim of the storage portion such that the winding-up tool 40 is rotatable in the direction indicated by the arrow in FIG. 9. Therefore, after the power cable 22 is wound up on the winding-up tool 40 as illustrated in FIG. 9A, the winding-up tool 40 is tilted down so as to rotate about the shaft 43A. Thus, the winding-up tool 40 on which the power cable 22 wound up can be stored in the storage portion 51 as illustrated in FIG. 9B. Also, in FIG. 9, other components included in the housing 50 of the puncture repair kit and a connection between the compressor body 21 and the power cable 22 are not illustrated to clarify the relationship between the winding-up tool 40 (the base 43) and the storage portion 51.

According to an embodiment of the present technology, after using the puncture repair kit, an operator performs an operation for winding up the power cable 22. Thus, preferably, the region of the power cable 22 to be wound up to appropriately store the power cable 22 is provided to the operator and thus the operator is encouraged to surely wind up this region. Specifically, a mark for indicating a range of the cable body 22A to be wound up on the winding-up tool 40 when the cable body 22A is wound up on the winding-up tool 40 may be preferably applied to the cable body 22A. Such a mark may adopt various configurations. As long as at least an end of the range of the cable body 22A to be wound up is clearly specified, the range to be wound up can be notified to the operator. Thus, for example, a tape having a color different from the color of the outer surface of the cable body 22A may be put around the end of the range. Alternatively, a line having a color different from the color of the cable body 22A may be provided on the end of the range.

The invention claimed is:

1. A puncture repair kit, comprising:
a container that stores a puncture repair liquid; and
a compressor that supplies compressed air, the compressor comprising a power cable for connection to a power supply when in use,
the power cable comprising a cable body comprising one end connected to the compressor and another end provided with a connection terminal;
the puncture repair kit comprising a winding-up tool that winds up the cable body; wherein
the compressor is housed in a housing,
the housing comprises a storage portion that receives the winding-up tool with the cable body wound up, and
the winding-up tool is detachable from the storage portion.

2. The puncture repair kit according to claim 1, wherein the winding-up tool comprises a holding portion that detachably holds the connection terminal.

3. The puncture repair kit according to claim 1, wherein a mark indicating a range of the cable body to be wound up on the winding-up tool is applied to the cable body.

4. The puncture repair kit of claim 1, wherein the winding-up tools is a separate part that is independent of the housing.

* * * * *